United States Patent
Daroussin et al.

(10) Patent No.: US 11,903,111 B2
(45) Date of Patent: Feb. 13, 2024

(54) MATRIX LIGHT SOURCE FOR A MOTOR VEHICLE

(71) Applicant: VALEO VISION, Bobigny (FR)

(72) Inventors: Samuel Daroussin, Bobigny (FR); Zdravko Zojceski, Bobigny (FR)

(73) Assignee: VALEO VISION, Bobigny (FR)

( * ) Notice: Subject to any disclaimer, the term of this patent is extended or adjusted under 35 U.S.C. 154(b) by 180 days.

(21) Appl. No.: 17/280,475

(22) PCT Filed: Sep. 25, 2019

(86) PCT No.: PCT/EP2019/075947
§ 371 (c)(1),
(2) Date: Mar. 26, 2021

(87) PCT Pub. No.: WO2020/064886
PCT Pub. Date: Apr. 2, 2020

(65) Prior Publication Data
US 2021/0360759 A1    Nov. 18, 2021

(30) Foreign Application Priority Data
Sep. 28, 2018  (FR) ..................... 18 59029

(51) Int. Cl.
*H05B 45/44* (2020.01)
*H05B 47/16* (2020.01)
*F21S 41/153* (2018.01)

(52) U.S. Cl.
CPC ............ *H05B 45/44* (2020.01); *F21S 41/153* (2018.01); *H05B 47/16* (2020.01)

(58) Field of Classification Search
CPC ........ H05B 45/10; H05B 45/44; H05B 47/10; H05B 47/16; F21S 41/153
See application file for complete search history.

(56) References Cited

U.S. PATENT DOCUMENTS

| | | | |
|---|---|---|---|
| 9,253,850 B2 * | 2/2016 | DeNicholas | ........... H05B 45/48 |
| 9,918,367 B1 | 3/2018 | Scenini et al. | |
| 2009/0116232 A1 * | 5/2009 | Chang | .................. H05B 45/22 362/231 |
| 2013/0313973 A1 | 11/2013 | DeNicholas et al. | |

(Continued)

FOREIGN PATENT DOCUMENTS

| CN | 1388497 A | 1/2003 |
|---|---|---|
| CN | 101916542 A | 12/2010 |

(Continued)

OTHER PUBLICATIONS

International Search Report dated Oct. 30, 2019 in PCT/EP2019/075947 filed Sep. 25, 2019, 2 pages.

(Continued)

*Primary Examiner* — Jimmy T Vu
(74) *Attorney, Agent, or Firm* — Oblon, McClelland, Maier & Neustadt, L.L.P.

(57) ABSTRACT

The invention relates to a matrix light source comprising a plurality of elementary light sources with light-emitting semiconductor elements, and a common substrate that is in contact with an integrated circuit. The integrated circuit is configured to delay, for a predetermined duration, the light-up of the elementary sources, upon receiving a light-up command.

20 Claims, 2 Drawing Sheets

(56) References Cited

U.S. PATENT DOCUMENTS

Figure 1:
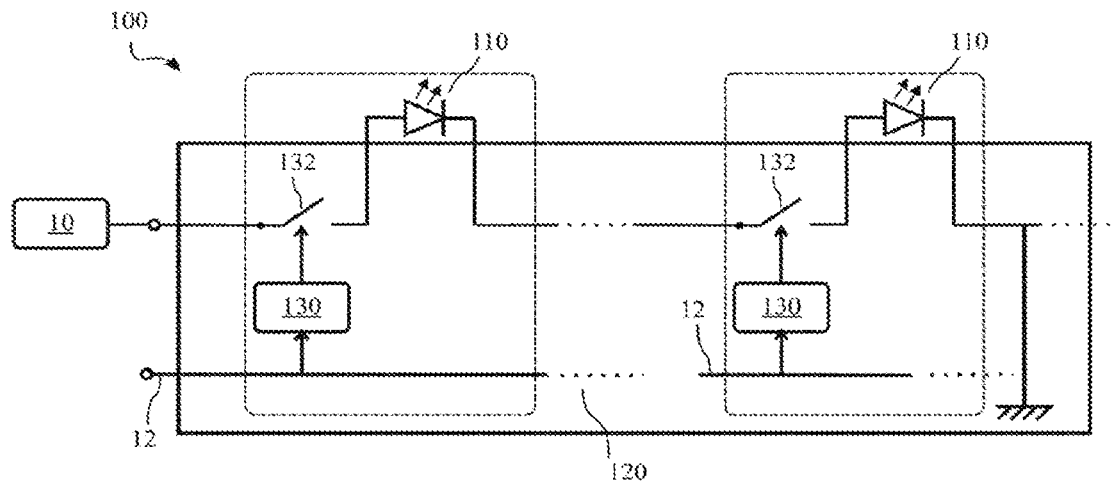

2014/0361696 A1* 12/2014 Siessegger ........... H05B 45/395
                                                    315/193
2016/0088699 A1   3/2016 DeNicholas et al.
2018/0070417 A1*  3/2018 Galvano ............ H05B 45/3725

FOREIGN PATENT DOCUMENTS

| CN | 102354484 A | 2/2012 |
| CN | 106993349 A | 7/2017 |
| CN | 107808628 A | 3/2018 |
| WO | WO 2010/147062 A1 | 12/2010 |

OTHER PUBLICATIONS

Combined Chinese Office Action and Search Report dated Dec. 13, 2022 in Chinese Patent Application No. 2019800642432 (with English translation of Office Action only), 11 pages.
Office Action dated May 4, 2023, in European Patent Application No. 19 772 771.2, 5 pages.
"Flip-flop (electronics)", Wikipedia, https://en.wikipedia.org/w/index.php?title=Flip-flop_(electronics)&oldid=861109093, Apr. 19, 2023, pp. 1-18.

* cited by examiner

MATRIX LIGHT SOURCE FOR A MOTOR VEHICLE

The invention relates to electroluminescent semiconductor element-based matrix light sources, in particular for motor vehicles. The invention relates in particular to a matrix light source whose electricity consumption is not liable to exhibit electric current peaks.

A light-emitting diode (LED) is a semiconductor electronic component capable of emitting light when an electric current flows therethrough. In the automotive field, LED technology is increasingly being used for numerous light signaling solutions. LEDs are used to provide lighting functions such as daytime running lights, signaling lights, etc. The brightness emitted by an LED is generally dependent on the intensity of the electric current flowing therethrough. Inter alia, an LED is characterized by an electric current intensity threshold value. This maximum forward current generally decreases with increasing temperature. Likewise, when an LED emits light, a voltage drop equal to its forward voltage or nominal voltage is observed at its terminals.

The utility of LED matrix arrays comprising a large number of elementary electroluminescent light sources is advantageous in numerous fields of application, and in particular also in the field of lighting and signaling for motor vehicles. A matrix array of LEDs may be used for example to create light beam forms that are beneficial for lighting functions, such as headlights or daytime running lights. In addition, a plurality of different lighting functions may be produced using a single matrix array, thus reducing the physical bulk in the restricted space of a motor vehicle headlight.

As is known, matrix light sources or, equivalently, pixelated light sources are controlled by a control unit that is physically remote from and electrically connected to the light source. The elementary light sources, or, equivalently, pixels that make up a matrix light source extend over very small dimensions, of the order of 50 to 200 μm each, and each of them consumes only a low-intensity current, of the order of 10 mA, when it is activated. However, when all of the elementary light sources of a matrix source have to be activated at the same time, an overall current peak of high intensity is consumed at the matrix light source: the electric current consumed by an elementary light source is multiplied by the number of pixels. For matrix sources with 256 pixels, a consumption peak of the order of 2.5 A may be observed. This value is obviously all the higher when the number of pixels and their individually consumed electric current increase. Such electric current peaks give rise to electromagnetic radiation that is liable to generate electromagnetic interference at other electronic components, the operation of which may thereby be degraded. This phenomenon is all the more critical in the field of light signaling for motor vehicles, in which a plurality of electronic components are located in the restricted volume that is available to house the components of a motor vehicle headlight.

One aim of the invention is to overcome at least one of the problems posed by the prior art. More precisely, one aim of the invention is to propose a matrix light source or pixelated light source whose electric current consumption, when its pixels are activated, is reduced.

According to a first aspect of the invention, what is proposed is a matrix light source comprising an integrated circuit and a matrix array of electroluminescent semiconductor element-based elementary light sources. The matrix light source is noteworthy in that the integrated circuit is in contact with the matrix array and comprises, for each of at least one set of elementary light sources, a delay unit configured so as to delay the activation of the elementary source by a predetermined period following the reception of an activation command for said set of elementary light sources.

According to another aspect of the invention, what is proposed is an integrated circuit for a matrix light source. The integrated circuit is intended to be in mechanical and electrical contact with a matrix array of elementary light sources of the matrix light source. The integrated circuit is noteworthy in that it comprises, for each of at least one set of elementary light sources, a delay unit configured so as to delay the activation of the elementary source by a predetermined period following the reception of an activation command for said set of elementary light sources.

The matrix array of elementary light sources may preferably comprise a common substrate supporting the elementary light sources. The common substrate of the matrix array may preferably comprise SiC.

The integrated circuit may preferably comprise an Si substrate. The integrated circuit is preferably soldered or adhesively bonded to the matrix array of elementary light sources, for example to a common substrate supporting the elementary light sources. The integrated circuit is preferably soldered or adhesively bonded to the lower face of the common substrate, opposite the face that comprises the elementary light sources. The integrated circuit is preferably in mechanical contact, for example via fastening means, and in electrical contact with the common substrate, which has electrical connection areas on its lower face.

The delay unit of each elementary light source of the set may preferably be functionally connected to the delay unit of another elementary light source of the set, the arrangement being such that the delay for the second elementary light source begins to elapse only once the delay of the first elementary light source has elapsed.

The delay unit of each elementary light source may preferably comprise a trigger circuit for sending a trigger signal to the light source that is connected thereto, following the elapsing of its own delay.

The delay for each elementary light source of the set may preferably be identical.

The delay unit may preferably comprise a memory element for recording a delay value.

The delay units of the elementary light sources of the set may preferably be functionally connected in sequence so as to form a chain.

Said set of light sources may preferably comprise all of the elementary light sources of the matrix light source.

The delay unit may preferably comprise a delay line.

The delay lines associated with all of the elementary light sources may preferably be clocked by way of the same clock signal.

According to another aspect of the invention, what is proposed is a lighting module for a motor vehicle. Said lighting module comprises a matrix light source and a circuit for driving the supply of electric power to said source. The lighting module is noteworthy in that the matrix light source is in accordance with one aspect of the invention.

The pixelated light source, or equivalently, the matrix light source, may preferably comprise at least one matrix array of electroluminescent elements—the elementary light sources—also called monolithic array, which elements are arranged in at least two columns by at least two rows. The electroluminescent source preferably comprises at least one monolithic matrix array of electroluminescent elements, also called a monolithic matrix array.

In a monolithic matrix array, the electroluminescent elements are grown from a common substrate and are electrically connected so as to be able to be activated selectively, individually or by subset of electroluminescent elements. Each electroluminescent element or group of electroluminescent elements may thus form one of the elementary emitters of said pixelated light source that is able to emit light when its or their material is supplied with electricity.

Various arrangements of electroluminescent elements may meet this definition of a monolithic matrix array, provided that the electroluminescent elements have one of their main dimensions of elongation substantially perpendicular to a common substrate and that the spacing between the elementary emitters, formed by one or more electroluminescent elements grouped together electrically, is small in comparison with the spacings that are imposed in known arrangements of flat square chips soldered to a printed circuit board.

The substrate may be made predominantly of semiconductor material. The substrate may comprise one or more further materials, for example non-semiconductor materials. These electroluminescent elements, of submillimeter dimensions, are for example arranged so as to project from the substrate so as to form rods of hexagonal cross section. The electroluminescent rods originate on a first face of a substrate. Each electroluminescent rod, formed in this case using gallium nitride (GaN), extends perpendicularly, or substantially perpendicularly, projecting from the substrate, in this case produced from silicon, with other materials, such as silicon carbide, being able to be used without departing from the context of the invention. By way of example, the electroluminescent rods could be produced from an alloy of aluminum nitride and of gallium nitride (AlGaN), or from an alloy of aluminum, indium and gallium phosphides (AlInGaP). Each electroluminescent rod extends along an axis of elongation defining its height, the base of each rod being arranged in a plane of the upper face of the substrate.

The electroluminescent rods of one and the same monolithic matrix array advantageously have the same shape and the same dimensions. They are each delimited by an end face and by a circumferential wall that extends along the axis of elongation of the rod. When the electroluminescent rods are doped and subjected to polarization, the resulting light at the output of the semiconductor source is emitted mainly from the circumferential wall, it being understood that light rays may also exit from the end face. The result of this is that each electroluminescent rod acts as a single light-emitting diode and that the luminance of this source is improved firstly by the density of the electroluminescent rods that are present and secondly by the size of the lighting surface defined by the circumferential wall and that therefore extends over the entire perimeter and the entire height of the rod. The height of a rod may be between 2 and 10 µm, preferably 8 µm. The largest dimension of the end face of a rod is less than 2 µm, preferably less than or equal to 1 µm.

It is understood that, when forming the electroluminescent rods, the height may be modified from one area of the pixelated light source to another in such a way as to boost the luminance of the corresponding area when the average height of the rods forming it is increased. Thus, a group of electroluminescent rods may have a height, or heights, that are different from another group of electroluminescent rods, these two groups forming the same semiconductor light source comprising electroluminescent rods of submillimeter dimensions. The shape of the electroluminescent rods may also vary from one monolithic matrix array to another, in particular over the cross section of the rods and over the shape of the end face. The rods have a generally cylindrical shape, and they may in particular have a polygonal and more particularly hexagonal cross section. It is understood that it is important, for light to be able to be emitted through the circumferential wall, that the latter has a polygonal or circular shape.

Moreover, the end face may have a shape that is substantially planar and perpendicular to the circumferential wall, such that it extends substantially parallel to the upper face of the substrate, or else it may have a shape that is curved or pointed at its center, so as to increase the directions in which the light exiting from this end face is emitted.

The electroluminescent rods may preferably be arranged in a two-dimensional matrix. This arrangement could be such that the rods are arranged in a quincunx. Generally speaking, the rods are arranged at regular intervals on the substrate and the distance separating two immediately adjacent electroluminescent rods, in each of the dimensions of the matrix array, should be at least equal to 2 µm, preferably between 3 µm and 10 µm, such that the light emitted through the circumferential wall of each rod is able to exit from the matrix array of electroluminescent rods. Provision is furthermore made for these separating distances, measured between two axes of elongation of adjacent rods, not to be greater than 100 µm.

As an alternative, the monolithic matrix array may comprise electroluminescent elements formed by layers of epitaxial electroluminescent elements, in particular a first layer of n-doped GaN and a second layer of p-doped GaN, on a single substrate, for example made of silicon carbide, and which is sliced (by grinding and/or ablation) to form a plurality of elementary emitters respectively originating from one and the same substrate. The result of such a design is a plurality of electroluminescent blocks all originating from one and the same substrate and electrically connected so as to be able to be activated selectively from one another.

In one exemplary embodiment according to this other embodiment, the substrate of the monolithic matrix array may have a thickness of between 5 µm and 800 µm, in particular equal to 200 µm; each block may have a length and a width, each being between 50 µm and 500 µm, preferably between 100 µm and 200 µm. In one variant, the length and the width are equal. The height of each block is less than 500 µm, preferably less than 300 µm. Finally, the exit surface of each block may be formed via the substrate on the side opposite the epitaxy. The separating distance between two elementary emitters. The distance between each contiguous elementary emitter may be less than 1 mm, in particular less than 500 µm, and it is preferably less than 200 µm.

As an alternative, both with electroluminescent rods extending respectively projecting from one and the same substrate, as described above, and with electroluminescent blocks obtained by slicing electroluminescent layers superimposed on one and the same substrate, the monolithic matrix array may furthermore comprise a layer of a polymer material in which the electroluminescent elements are at least partially embedded. The layer may thus extend over the entire extent of the substrate, or only around a given group of electroluminescent elements. The polymer material, which may in particular be silicone-based, creates a protective layer that makes it possible to protect the electroluminescent elements without impairing the diffusion of the light rays. Furthermore, it is possible to integrate, into this layer of polymer material, wavelength conversion means, for example luminophores, that are able to absorb at least some of the rays emitted by one of the elements and to convert at least some of said absorbed excitation light into an emission light having a wavelength that is different from that of the excitation light. Provision may be made without distinction for the luminophores to be embedded in the mass of the polymer material, or else to be arranged on the surface of the layer of this polymer material.

The pixelated light source may furthermore comprise a coating of reflective material to deflect the light rays to the exit surfaces of the light source.

The electroluminescent elements of submillimeter dimensions define a given exit surface in a plane substantially parallel to the substrate. It will be understood that the shape of this exit surface is defined as a function of the number and the arrangement of the electroluminescent elements that form it. It is thus possible to define a substantially rectangular shape of the emission surface, it being understood that the latter may vary and adopt any shape without departing from the context of the invention.

By using the measures proposed by the present invention, it becomes possible to propose a matrix light source or pixelated light source whose electric current consumption, when its pixels are activated, is reduced. By potentially delaying the activation on an individual basis for each pixel, the invention is capable of smoothing, over time, the current intensity peak that occurs in known solutions at the time of activation of a matrix light source. This smoothing of the electric current consumption results in a reduction in electromagnetic radiation, thereby creating a reduced risk of electromagnetic interference at other electronic components that are in the physical proximity of the matrix light source. Since the delays for each pixel are still short, the effect of the delay is generally not visible, or is barely visible.

Figure 2:
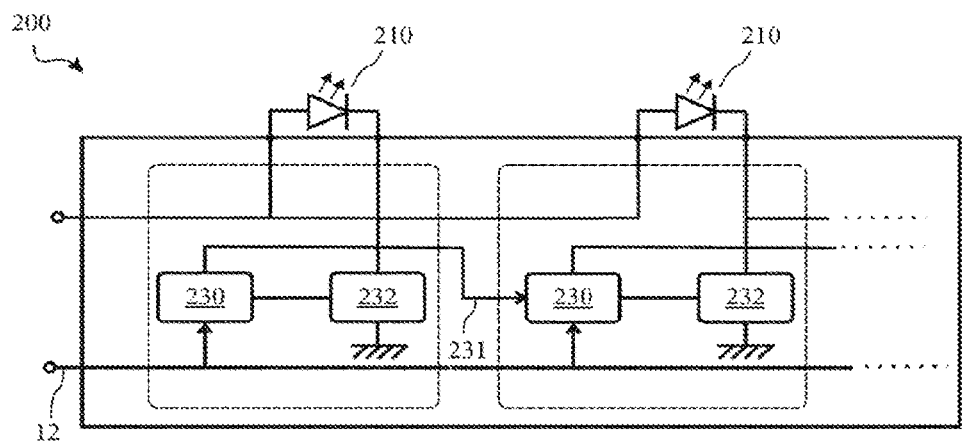
Figure 3:
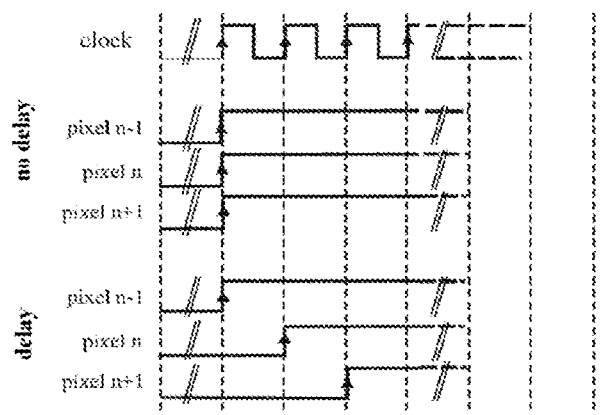
Figure 4:
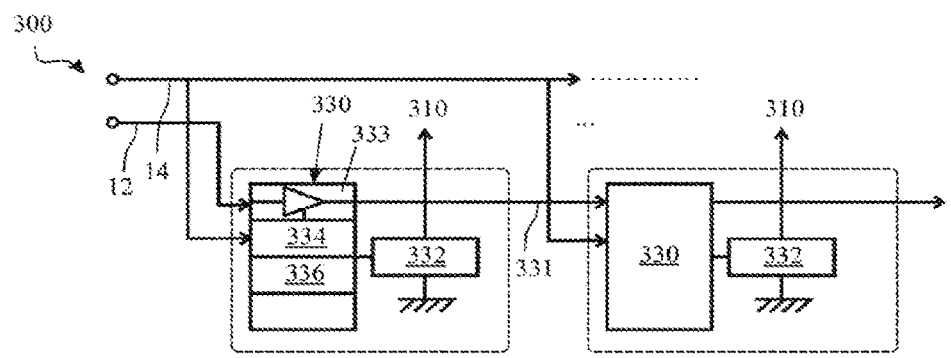
Figure 5:
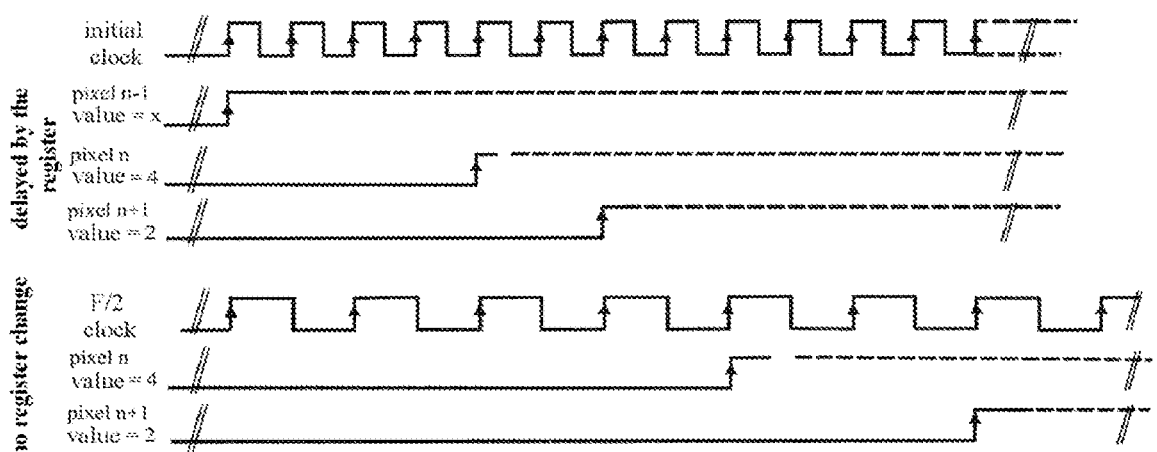

Other features and advantages of the present invention will be better understood with the aid of the description of the examples and of the drawings, in which:

FIG. 1 schematically shows a matrix light source according to one preferred embodiment of the invention;

FIG. 2 schematically shows a matrix light source according to one preferred embodiment of the invention;

FIG. 3 shows timing diagrams indicating the activation time per pixel following an activation instruction received by a matrix light source according to, according to the prior art and according to one preferred embodiment of the invention;

FIG. 4 schematically shows details of a matrix light source according to one preferred embodiment of the invention;

FIG. 5 shows timing diagrams indicating the activation time per pixel following an activation instruction received by a matrix light source according to preferred embodiments of the invention.

Unless specified otherwise, technical features that are described in detail for one given embodiment may be combined with the technical features that are described in the context of other embodiments described by way of examples and without limitation. Similar reference numerals will be used to describe similar concepts across various embodiments of the invention. For example, the references 100, 200 and 300 denote three embodiments of a matrix light source according to the invention.

The illustration in FIG. 1 shows a pixelated light source or matrix light source 100 according to one preferred embodiment of the invention. The matrix light source 100 comprises a plurality of electroluminescent semiconductor element-based elementary light sources 110 and a common substrate, not illustrated, in mechanical and electrical contact with and functionally connected to an integrated circuit 120. The elementary light sources are typically light-emitting diodes (LEDs).

The matrix light source 100 preferably comprises a monolithic matrix array component, in which the semiconductor layers of the elementary light sources 110 are for example arranged on the common substrate. The matrix array of elementary light sources 110 preferably comprises a parallel assembly of a plurality of branches, each branch comprising electroluminescent semiconductor light sources 110.

By way of example and without limitation, the matrix array of elementary light sources comprises, along the thickness of the substrate and starting at the end opposite the location of the elementary sources 110, a first electrically conductive layer deposited on an electrically insulating substrate. This is followed by an n-doped semiconductor layer whose thickness is between 0.1 and 2 µm. This thickness is much smaller than that of known light-emitting diodes, for which the corresponding layer has a thickness of the order of 1 to 2 µm. The following layer is the active quantum well layer having a thickness of around 30 nm, followed by an electron-blocking layer, and finally a p-doped semiconductor layer, the latter having a thickness of around 300 nm. Preferably, the first layer is an (Al)GaN:Si layer, the second layer is an n-GaN:Si layer, and the active layer comprises quantum wells made of InGaN alternating with barriers made of GaN. The blocking layer is preferably made of AlGaN:Mg and the p-doped layer is preferably made of p-GaN:Mg. n-doped gallium nitride has a resistivity of 0.0005 ohm/cm, whereas p-doped gallium nitride has a resistivity of 1 ohm/cm. The thicknesses of the proposed layers make it possible in particular to increase the internal series resistance of the elementary source, while at the same time significantly reducing its manufacturing time, as the n-doped layer is not as thick in comparison with known LEDs and requires a shorter deposition time. By way of example, a time of 5 hours is typically required for MOCVD depositions for a standard-configuration LED with 2 µm of n layer, and this time may be reduced by 50% if the thickness of the n layer is reduced to 0.2 µm.

In order to achieve elementary light sources 110 having semiconductor layers having homogeneous thicknesses, the monolithic component 100 is preferably manufactured by depositing the layers homogeneously and uniformly over at least part of the surface of the substrate so as to cover it. The layers are deposited for example using a metal oxide chemical vapor deposition (MOCVD) method. Such methods and reactors for implementing them are known for depositing semiconductor layers on a substrate, for example from patent documents WO 2010/072380 A1 or WO 01/46498 A1. Details on their implementation will therefore not be described in the context of the present invention. The layers thus formed are then pixelated. By way of example and without limitation, the layers are removed using known lithographic methods and by etching at the sites that subsequently correspond to the spaces between the elementary light sources 110 on the substrate. A plurality of several tens or hundreds or thousands of pixels 110 having a surface area smaller than one square millimeter for each individual pixel, and having a total surface area greater than 2 square millimeters, having semiconductor layers with homogeneous thicknesses, and therefore having homogeneous and high internal series resistances, are thus able to be produced on the substrate of a matrix light source 100. Generally speaking, the more the size of each LED pixel decreases, the more its series resistance increases, and the more this pixel is able to be driven by a voltage source. As an alternative, the substrate comprising the epitaxial layers covering at least part of the surface of the substrate is sawn or divided into elementary light sources, each of the elementary light sources having similar characteristics in terms of their internal series resistance.

The invention also relates to types of semiconductor element-based elementary light sources involving other configurations of semiconductor layers. In particular the substrates, the semiconductor materials of the layers, the arrangement of the layers, their thicknesses and any vias between the layers may be different from the example that has just been described.

The integrated circuit 120 is preferably soldered to the lower face of the common substrate, which houses the elementary light sources, so as to establish mechanical and electrical contact with the substrate and the elementary light sources. The integrated circuit furthermore comprises, for at least one but preferably for all the elementary light sources 110, a delay unit 130 configured so as to delay the activation of the elementary light source by a predetermined period following the reception of an activation command 12, typically generated by a control unit external to the matrix light source 100. The delay unit 130 is formed for example by an electronic circuit that forms a delay line. Such electronic circuits are well known in the prior art, and their operation will not be described in detail in the context of the present invention. The delay produced for each of the elementary sources 110 is preferably different, such that a control signal 12 intended at the same time for all the elementary sources 110 of the matrix source 100 is delayed differently for each of them, or at least for separate sets of elementary light sources. Since the activation of the elementary light sources is potentially delayed on an individual basis for each elementary light source, this makes it possible to avoid a single maximum peak in the electricity consumption of the matrix light source 100 when the control signal 12 takes effect.

Using an integrated circuit 120 in mechanical and electrical contact with the substrate on which the elementary light sources reside makes it possible to dispense with wired connections, the number of which would be at least equal to the number of pixels of the matrix light source.

Depending on the matrix light source, this may be voltage-driven or electric current-driven by an electric power supply drive circuit. Such circuits are known per se in the art, and their operation will not be described in detail in the context of the present invention. They involve at least one converter circuit capable of converting an input voltage/current, supplied for example by a voltage/current source internal to a motor vehicle, such as a battery, into an output voltage/current, with an intensity suitable for supplying power to the matrix light source. When the matrix light source is voltage-driven, the driving of each elementary source, or equivalently, of each pixel, merely entails controlling a switch device 132 as shown schematically in FIG. 1. By controlling the state of the device 132, the elementary light source 110 may be selectively connected to the voltage source 10. The switch device is for example formed by a MOSFET field-effect transistor, preferably characterized by a low voltage drop between its drain and source terminals, and controlled by the control signal 12 delayed by the delay unit 130.

Preferably, not only the switch elements 132 but also a power supply circuit may be integrated into the substrate 120 when the monolithic component 100 is manufactured.

The illustration in FIG. 2 shows a pixelated light source or matrix light source 200 according to one preferred embodiment of the invention. The matrix light source 200 comprises a plurality of electroluminescent semiconductor element-based elementary light sources 210 and a common substrate, not illustrated, in contact with and functionally connected to an integrated circuit 220. The elementary light sources are typically light-emitting diodes (LEDs).

The matrix light source 200 is preferably a monolithic component in which the semiconductor layers of the elementary light sources 210 are arranged on the common substrate. The matrix light source 200 preferably comprises a parallel assembly of a plurality of branches, each branch comprising electroluminescent semiconductor light sources 210.

The integrated circuit 220 furthermore comprises, for at least one but preferably for all the elementary light sources 210, a delay unit 230 configured so as to delay the activation of the elementary light source by a predetermined period following the reception of an activation command 12, which is preferably binary, typically generated by a control unit external to the matrix light source 200. The delay unit 230 is formed for example by an electronic circuit that forms a delay line.

Depending on the matrix light source, this may be voltage-driven or electric current-driven by an electric power supply drive circuit. Controlling a switch device 232 makes it possible to selectively supply electricity to the elementary light source 210. In the embodiment illustrated by FIG. 2, this control is performed by the delay unit 230, which reproduces a delayed version of the control signal 12. The delay units 230 associated with various elementary light sources 210 are connected, preferably in a chain, to one another via an electrical connection 231. When the delay for an elementary light source (on the left) has elapsed, the delay unit 230 (on the left) controls the switch device 232 so as to supply electricity to the elementary light source 210 (on the left). At the same time, the delay unit 230 (on the left) transmits an "enable" trigger signal, for example a binary signal, to the homologous delay unit 230 (on the right) associated with the elementary light source 210 (on the right). Only upon receiving this "enable" signal from the delay unit (on the left) does the delay unit 230 (on the right) start counting down its predetermined delay. When the delay for the elementary light source (on the right) has elapsed, the delay unit 230 (on the right) controls the switch device 232 so as to supply electricity to the elementary light source 210 (on the right). Even if the two delay units are configured so as to implement a countdown of a similar duration, this means that the effective delays are different for the two elementary light sources, since the delays between connected delay units accumulate. For the delay unit 230 (on the right) in the given example, the effective delay is twice the effective delay of the delay unit 230 (on the left). The delay units are preferably clocked by a regular clock signal, not illustrated. Since the activation of the elementary light sources forming part of the chain that connects their respective delay units is delayed on an individual basis for each elementary light source, this makes it possible to avoid a single maximum peak in the electricity consumption of the matrix light source 200 when the control signal 12 takes effect.

FIG. 3 shows the evolution over time of a regular binary clock signal that serves to clock the delay units 230 in FIG. 2. Below the clock signal, the activation time for three pixels is shown using a matrix source known from the prior art: the pixels indicated by n−1, n and n+1 are supplied with electricity at the same time, corresponding to the reception of the activation instruction 12. At the bottom of FIG. 3, the activation time for three pixels using a matrix source according to the embodiment of the figure is illustrated. The delay units of each of the pixels n−1, n and n+1 are functionally connected to one another such that the delay of the pixel n begins to elapse only once the delay of the pixel n−1 has elapsed, and so on. In this case, each delay unit implements an identical delay of one clock cycle.

In the example illustrated, the delay units are synchronized with respect to the rising edge of the clock signal, without this limiting the invention. Specifically, the delay units may also be synchronized with respect to the rising edge of the clock signal, or else with respect to a predetermined point in the cycle of the clock signal.

The illustration in FIG. 4 shows details of an integrated circuit of a pixelated light source or matrix light source 300 according to one preferred embodiment of the invention. The matrix light source 300 comprises a plurality of electroluminescent semiconductor element-based elementary light sources 310 and a common substrate, not illustrated, in contact with and functionally connected to the integrated circuit. The elementary light sources are typically light-emitting diodes (LEDs).

The integrated circuit furthermore comprises, for at least one but preferably for all the elementary light sources, a delay unit 330 configured so as to delay the activation of the elementary light source by a predetermined period following the reception of an activation command 12, which is preferably binary, typically generated by a control unit external to the matrix light source 300. The delay units 30 of the elementary light sources are connected to one another, just as in the embodiment described with reference to FIG. 2, and clocked by a common regular binary clock signal 14.

A delay unit 330 comprises a logic unit 333 formed for example by a comparison circuit. The logic unit 333 compares the control signal 12 with a status signal generated by a countdown unit 334. The status signal is for example zero when the delay has not yet elapsed, and the signal toggles to a non-zero value when the delay has elapsed. If both signals have a non-zero value, the resulting trigger signal 331 is non-zero. It then relays the control signal to the delay unit 330 (on the right) in order to trigger the respective delay there. The countdown unit 334 comprises for example a countdown circuit, configured so as to read the value of the delay to be counted down from a memory element or register 336 of the integrated circuit. When the countdown has ended, the delay unit 330 controls the device 332 so as to supply electricity to the light source 310 associated therewith. Using a memory element 336 to record the respective delay of each elementary light source allows increased flexibility. Different delays may be recorded for various elementary light sources, and the recorded values may be modified by write instructions to the respective memory elements 336 over time. The effective delays for each light source obviously also depend on the frequency of the clock signal 14. It goes without saying that the integrated circuit may comprise additional electronic circuits, indicated by the hatched area in FIG. 4. This may in particular be a circuit performing diagnostic functions on the operation of the elementary light source.

FIG. 5 shows the evolution over time of a regular binary clock signal that serves to clock the delay units 430 in FIG. 3. Below the clock signal, the activation time for a pixel n−1 is shown using a matrix source known from the prior art: the indicated pixel is supplied with electricity upon receiving the activation instruction 12. Below, the activation time for two pixels using a matrix source according to the embodiment of FIG. 4 is illustrated. The delay units of each of the pixels n and n+1 are functionally connected to one another such that the delay of the pixel n+1 begins to elapse only once the delay of the pixel n has elapsed. In this case, the delay unit of the pixel n implements a delay of four clock cycles, while the delay unit of the pixel n+1 implements a delay of two clock cycles, which begins to elapse only once the delay of the pixel n has elapsed. At the bottom of the figure, it may be seen that the effective delays may also be modified by modifying the frequency of the clock signal. In the example shown, the frequency of the signal is doubled in comparison with the example shown in the middle of the figure.

The scope of protection is defined by the claims.

The invention claimed is:

1. A matrix light source comprising an integrated circuit and a matrix array of lights with a first electroluminescent semiconductor element-based elementary light source and a second electroluminescent semiconductor element-based elementary light source, wherein the integrated circuit is in contact with the matrix array and further comprises, a delay unit which is functionally connected to the first and second elementary light sources and is configured so as to delay the activation of the second elementary light source by a predetermined period following the reception of an activation command.

2. A matrix light source comprising an integrated circuit and a matrix array of lights with a first electroluminescent semiconductor element-based elementary light source and a second electroluminescent semiconductor element-based elementary light source, wherein the integrated circuit is in contact with the matrix array and further comprises a delay unit which is configured so as to delay the activation of the elementary light source by a predetermined period following the reception of an activation command, and wherein the delay unit of each elementary light source of the set is functionally connected to the delay unit of another elementary light source of the set, the arrangement being such that the delay for the second elementary light source begins to elapse only once a delay of the first elementary light source has elapsed.

3. The light source as claimed in claim 2, wherein the delay unit of each elementary light source comprises a trigger circuit for sending a trigger signal to the light source that is connected thereto, following the elapsing of the first elementary light source's delay.

4. The light source as claimed in claim 1, wherein the delay for each elementary light source of the set is identical.

5. The light source as claimed in claim 1, wherein the delay unit comprises a memory element for recording a delay value.

6. The light source as claimed in claim 2, wherein the delay units of the elementary light sources of the set are functionally connected in sequence so as to form a chain.

7. The light source as claimed in claim 1, wherein the delay unit comprises a delay line.

8. The light source as claimed in claim 7, wherein the delay lines associated with all of the elementary light sources are clocked by way of the same clock signal.

9. A lighting module for a motor vehicle, comprising a matrix light source and a circuit for driving the supply of electric power to said source, wherein the matrix light source is as claimed in claim 1.

10. The light source as claimed in claim 2, wherein the delay for each elementary light source of the set is identical.

11. The light source as claimed in claim 2, wherein the delay unit comprises a memory element for recording a delay value.

12. The light source as claimed in claim 3, wherein the delay units of the elementary light sources of the set are functionally connected in sequence so as to form a chain.

13. The light source as claimed in claim 2, wherein the delay unit comprises a delay line.

14. A lighting module for a motor vehicle, comprising a matrix light source and a circuit for driving the supply of electric power to said source, wherein the matrix light source is as claimed in claim 2.

15. The light source as claimed in claim 4, wherein the delay units of the elementary light sources of the set are functionally connected in sequence so as to form a chain.

16. The light source as claimed in claim 3, wherein said set of light sources comprises all of the elementary light sources of the matrix light source.

17. A matrix light source comprising an integrated circuit and a matrix array of lights with a first electroluminescent semiconductor element-based elementary light source and a second electroluminescent semiconductor element-based elementary light source, wherein the integrated circuit is in contact with the matrix array and further comprises delay units which is functionally connected to the first and second elementary light sources in sequence so as to form a chain and is configured so as to delay the activation of the second elementary light source by a predetermined period following the reception of an activation command.

18. The light source as claimed in claim 17, wherein the delay for each elementary light source of the set is identical.

19. The light source as claimed in claim 17, wherein the delay unit comprises a memory element for recording a delay value.

20. The light source as claimed in claim 17, wherein the delay unit comprises a delay line.

* * * * *